United States Patent [19]

Battiste et al.

[11] Patent Number: 4,637,991

[45] Date of Patent: Jan. 20, 1987

[54] PILLARED INTERLAYERED CLAYS

[75] Inventors: David R. Battiste; Jesse R. Harris, both of Bartlesville, Okla.

[73] Assignee: Phillips Petroleum Company, Bartlesville, Okla.

[21] Appl. No.: 742,815

[22] Filed: Jun. 10, 1985

[51] Int. Cl.$^4$ .......................... B01J 21/16; B01J 29/06
[52] U.S. Cl. .......................................... 502/68; 502/84
[58] Field of Search .................................... 502/68, 84

[56] References Cited

U.S. PATENT DOCUMENTS

| | | | |
|---|---|---|---|
| 4,176,090 | 11/1979 | Vaughan et al. | 252/455 Z |
| 4,216,188 | 8/1980 | Shabrai et al. | 423/118 |
| 4,248,739 | 2/1981 | Vaughan et al. | 252/455 R |
| 4,271,043 | 6/1981 | Vaughan et al. | 252/455 R |
| 4,410,751 | 10/1983 | Shin et al. | 502/84 X |
| 4,443,553 | 4/1984 | Chiang et al. | 502/68 |
| 4,458,023 | 7/1984 | Welsh et al. | 502/68 X |
| 4,510,257 | 4/1985 | Lewis et al. | 502/84 X |
| 4,515,901 | 5/1985 | Elattar | 502/84 X |
| 4,542,118 | 9/1985 | Nozemack et al. | 502/68 X |

OTHER PUBLICATIONS

Clays and Clay Minerals, vol. 26, No. 2, pp. 107–115, 1978, "Cross-Linked Smectites, Synthesis and Properties of Hydroxy-Aluminum-Montmorillonite".

Primary Examiner—Carl F. Dees
Attorney, Agent, or Firm—A. W. Umphlett

[57] ABSTRACT

Pillared, interlayered clay products suitable as gas separation agents or as substrates for catalyst compositions are prepared by methods that provide an increase in surface area and pore volume as compared to similar products made by prior art methods.

45 Claims, No Drawings

PILLARED INTERLAYERED CLAYS

BACKGROUND OF THE INVENTION

This invention relates to pillared interlayered clay compositions. In one of its aspects it relates to a method for preparing a pillared interlayered clay product. In still another aspect of this invention it relates to the treatment of reactants used in preparing pillared interlayered clays. In another of its aspects the invention relates to preparation of pillared interlayered clays that provide product of increased surface area and pore volume as compared to products made outside of this manner of preparation.

It is well known to make pillared interlayered clay compositions by reacting a smectite-type clay, such as bentonite, with an aqueous solution of a polymeric cationic hydroxy inorganic metal complex such as Chlorohydrol ®. Upon dehydration of the reaction product, there results a smectite clay which includes an inorganic oxide such as alumina interspersed between layers of the clay. This inorganic oxide is in the form of pillars which support the layers of clay so that the clay layers are separated from each other at a uniform distance.

In the present invention it has been found that a special treatment of the aqueous solution of the polymeric cationic hydroxy inorganic metal complex can be used to produce pillared interlayered clays having greater surface area and pore volume than pillared interlayered clays produced without using this treatment of the aqueous solution of the polymeric cationic hydroxy inorganic metal complex.

It is therefore an object of this invention to provide a method by which the surface area and pore volume of pillared interlayered clay can be increased. It is another object of this invention to provide pillared interlayered clay product that contains an admixture of zeolite in its structure. It is still another object of this invention to provide a method of preparing a promoted catalyst by impregnating the pillared interlayered clay product of this invention with catalytic material. It is still another object of this invention to provide an improved pillared interlayered clay product. It is yet another object of this invention to provide an improved pillared interlayered clay product containing zeolite material. It is still another object of this invention to provide a promoted catalyst. In other objects of this invention, methods are provided for separating gases and for promoting catalytic reaction using pillared interlayered clay products with this invention.

Other aspects, objects and the various advantages of this invention will become apparent upon reading this specification and the appended claims.

STATEMENT OF THE INVENTION

According to this invention a method is provided for preparing a pillared interlayered clay product in which an aluminum hydroxy chloride is diluted with water to obtain an aqueous solution containing from about 0.4 to about 10 weight percent aluminum hydroxy chloride; this solution is maintained at room temperature or above, preferably about 20° C. to about 70° C., for a time sufficient to increase the surface area and pore volume of a pillared interlayered clay product subsequently obtained from the reaction of smectite clay with the aqueous solution; the aqueous solution is reacted with smectite clay to obtain an aluminum-exchanged clay product in an aqueous liquid; the aluminum-exchanged clay product is separated from the aqueous liquid; a separated aluminum-exchanged clay product is dispersed in water, preferably distilled water; aluminum-exchanged clay product is separated from the distilled water; the aluminum-exchanged clay product is dried to obtain a substantially dry aluminum-exchanged clay product which is then calcined to obtain a calcined aluminum-exchanged product which is pillared interlayered clay product.

In preferred embodiments of this invention the reaction of the smectite clay with the aqueous solution of aluminum hydroxy chloride is an agitation of the clay and aqueous solution at room temperature or above, preferably a temperature in a range from about 20° C. to about 70° C., for a time sufficient for an aluminum-exchanged smectite product to be formed and the preferred method for separation of the aluminum-exchanged clay product from the aqueous liquid is obtaining a filter cake of the aluminum-exchanged clay product.

In another embodiment of the invention ion-exchanged, pillared, interlayered clay product is prepared by further treating the aluminum-exchanged clay product prepared as set out above in the following manner: contacting the aluminum-exchanged clay product with a solution of a metal ion-exchangable compound such as calcium acetate for a time sufficient to produce a metal ion-exchanged clay product; separating this metal ion-exchange clay product from the solution; drying the metal ion-exchange product to obtain a substantially dried metal ion-exchanged clay product; and calcining the dried metal ion-exchanged clay product to obtain a calcined metal ion-exchanged clay product which is a pillared interlayered clay product.

In still another embodiment of this invention a method is provided for preparing a pillared interlayered clay admixed with zeolite. In this process, an aluminum-exchanged clay product formed as set out above, is contacted with a sufficient amount of distilled water to provide a washed aluminum-exchanged clay product which is then recovered from the wash; agitating the recovered aluminum-exchanged clay product with aqueous solution containing aluminum hydroxy chloride and zeolite to produce a slurry of a mixture of aluminum-exchanged clay product and aluminum hydroxy chloride treated zeolite in aqueous liquid; separating the mixture of aluminum-exchanged clay product and aluminum hydroxy chloride treated zeolite from the aqueous liquid; drying the mixture to obtain a substantially dry mixture of aluminum-exchanged clay product and aluminum hydroxy chloride treated zeolite; and calcining the mixture to obtain a calcined mixture of aluminum-exchanged clay product and aluminum hydroxy chloride treated zeolite which is a pillared, interlayered clay product.

In a further embodiment of this invention a method is provided for preparing a promoted pillared clay catalyst in which a pillared, interlayered clay product which is a calcined product prepared as set out above is contacted with an impregnating solution of a catalytically active compound or mixture of compounds for a time sufficient to impregnate the pillared interlayered clay product with a catalytic amount of the catalytically active compound or mixture of compounds with the subsequent recovery of the impregnated pillared interlayered clay product from the impregnating solution.

In further embodiments of the invention the compositions prepared by the methods set out above are provided and methods are provided using these products for separating gases, such as methane from ethane and $O_2$ from $N_2$, and for promoting catalytic reactions such as hydrocarbon conversion reactions, specifically hydrocracking of hydrocarbon oils among others.

The processes and products of this invention can be best be understood by a study of the examples. In the examples that follow, the data collected should be taken as exemplary and not as restrictive.

EXAMPLE I

This example illustrates the preparation of pillared clays and the effects of various preparation parameters on surface properties of the formed pillared clays.

A solution of an aluminum hydroxy chloride complex, provided by Reheis Chemical Company, a division of Revlon, Inc., Berkely Heights, NJ, under the trademark Chlorhydrol®, was used as the pillaring agent. Chlorhydrol® was a 50 weight-% aqueous solution of an aluminum hydroxy chloride compound having an aluminum to chloride atomic ratio of about 2:1, a hydroxide to aluminum atomic ratio of about 2.5:1 and having the approximate chemical formula $Al_2(OH)_5Cl.2H_2O$ (formula weight: 210). 300 mL (418.5 g) of Chlorhydrol® was diluted with 17.7 liters of distilled water so as to prepare pillaring Solution A containing 11.6 g/L (1.15 weight-%) of solid Al hydroxy chloride (3.0 grams of Al per liter Solution A).

300 grams of Bentonite clay (supplied by American Colloid Company, Skokie, Ill., were added to 9 liters of Solution A. The formed slurry (containing 30 mL of Solution A per gram clay; equivalent to 90 mg Al per gram clay) was stirred at about 60° C. for about 2 hours and then filtered to provide a filter cake of the aluminum-exchanged clay product. The filter cake was redispersed in 4 liters of distilled water and stirred at 60° C. for about one hour, to provide washed aluminum-exchanged clay which was collected by filtration, oven-dried at about 100° C. for about 15 hours, and calcined in air at about 500° C. for about 2 hours.

Surface area and pore size distribution of the prepared pillared clays prepared as set out above were determined according to the BET/$N_2$ method (ASTM D3037) by means of an automated instrument described by K. F. Dahnke at the Pittsburgh Conference on Analytical Chemistry and Applied Spectroscopy, March, 1981. Pore volume and surface area distributions were determined from nitrogen adsorption and desorption isotherms. Each pillared clay sample was activated at 300° C. for one hour before measurements of the isotherms.

The BET/$N_2$ surface area and the pore volume (up to 300 Å pore diameter) depended on the length of time during which Solution A was heated (aged) at 60° C. prior to the addition of the clay, as shown by data summarized in Table I.

TABLE I

| | Aging Time of Solution A (Days) | Surface Area ($m^2/g$) | Pore Volume[1] (cc/g) |
|---|---|---|---|
| Run 1 | 0 | 101 | 0.120 |
| Run 2[2] | 0 | 97 | 0.073 |
| Run 3 | 3 | 161 | 0.135 |
| Run 4 | 6 | 211 | 0.149 |
| Run 5 | 6 | 198 | 0.119 |
| Run 6 | 34 | 220 | 0.153 |

[1]Volume of pores up to 300 Å.
[2]Chlorhydrol® was added to clay dispersed in water.
Notes:
(A) Unpillared Bentonite clay had a surface area of 46 $m^2/g$ and a pore volume of 0.052 cc/g.
(B) A pillared clay, which was prepared with unaged Solution A that was heated to 90° C., had a surface area of 192 $m^2/g$ and a pore volume of 0.141 cc/g.

EXAMPLE II

In this example additional tests are described, wherein pillared clays were prepared substantially in accordance with the procedure described in Example I, except that different concentrations of aluminum hydroxy chloride in the pillaring solution and different aging times of the pillaring solution (before addition of clay) were employed. Pertinent preparation conditions affecting the pillared clay properties are summarized in Table II. The aging temperature in all runs was room temperature (20°–25° C.), except in runs 13, 15, 17 and 20 in which the aging temperature was about 65° C.

TABLE II

| | Weight-% of Al Hydroxy Chloride in Pillar. Solution | Days of Aging of Pillar. Solution | mL Pillar. Solution per Gram Clay | Milligrams Al per Gram Clay | pH of Slurry[1] | Surface Area of Pillared Clay ($m^2/g$) |
|---|---|---|---|---|---|---|
| Run 7 | 0.05 | 0 | 303 | 39 | 4.9 | 199 |
| Run 8 | 0.05 | 10 | 303 | 39 | 4.7 | 223 |
| Run 9 | 0.05 | 25 | 303 | 39 | 4.7 | 223 |
| Run 10 | 0.36 | 0 | 45 | 39 | 4.8 | 160 |
| Run 11 | 0.34 | 0 | 45 | 39 | 4.7 | 160 |
| Run 12 | 0.34 | 1 | 45 | 39 | 4.7 | 219 |
| Run 13 | 0.34 | 1 | 45 | 39 | 4.4 | 222 |
| Run 14 | 0.34 | 2 | 45 | 39 | 4.8 | 188 |
| Run 15 | 0.34 | 2 | 45 | 39 | 4.5 | 235 |
| Run 16 | 0.34 | 3 | 45 | 39 | 4.8 | 207 |
| Run 17 | 0.34 | 3 | 45 | 39 | 4.4 | 197 |
| Run 18 | 0.34 | 6 | 99 | 87 | 4.8 | 215 |
| Run 19 | 0.34 | 7 | 45 | 39 | 4.9 | 229 |
| Run 20 | 0.34 | 7 | 45 | 39 | 4.4 | 212 |
| Run 21 | 0.34 | 10 | 45 | 39 | 4.9 | 172[2] |
| Run 22 | 0.34 | 10 | 45 | 39 | 4.8 | 248 |
| Run 23 | 0.34 | 20 | 45 | 39 | 4.7 | 240 |
| Run 24 | 0.34 | 20 | 45 | 39 | 4.8 | 233 |
| Run 25 | 0.34 | 53 | 45 | 39 | 4.6 | 262 |
| Run 26 | 0.50 | 0 | 60 | 77 | 4.6 | 249 |
| Run 27 | 0.50 | 10 | 60 | 77 | 4.8 | 301 |
| Run 28 | 0.50 | 25 | 60 | 77 | 4.8 | 322 |
| Run 29 | 0.67 | 0 | 45 | 78 | 4.5 | 301 |

TABLE II-continued

| | Weight-% of Al Hydroxy Chloride in Pillar. Solution | Days of Aging of Pillar. Solution | mL Pillar. Solution per Gram Clay | Milligrams Al per Gram Clay | pH of Slurry[1] | Surface Area of Pillared Clay (m²/g) |
|---|---|---|---|---|---|---|
| Run 30 | 0.67 | 10 | 45 | 78 | 4.8 | 327 |
| Run 31 | 0.67 | 25 | 45 | 78 | 4.9 | 333 |
| Run 32 | 5.00 | 0 | 50 | 643 | 4.3 | 220 |
| Run 33 | 5.00 | 10 | 50 | 643 | 4.5 | 283 |
| Run 34 | 5.00 | 25 | 50 | 643 | 4.4 | 272 |

[1]Slurry of pillared clay in pillaring solution.
[2]Believed to be erroneous; most probably accidental overheating occurred.

Data in Table II confirm the earlier described effect on the surface properties of the prepared pillared clay of aging of the pillaring solution (containing the above-described aluminum hydroxy chloride complex) before mixing with the clay. The surface area of the pillared clay was consistently higher in tests employing the same Al/clay ratio when the pillaring solution was aged one day or longer.

In addition, higher concentrations of the aluminum hydroxy chloride complex in the pillaring solution also had a beneficial effect on the surface area of the prepared pillared clays. If surface areas of pillared clays produced in comparative runs (aging times: 10 and 20–25 days) are plotted versus the logarithm of the concentrations of the pillaring solution, the graphic representation would show that maximum surface areas (larger than about 260 m²/g) would be obtained with pillaring solutions containing from about 0.4 to about 10 weight-%, preferably from about 0.5 to about 3 weight-%, of $Al_2(OH)_5Cl \cdot 2H_2O$.

EXAMPLE III

This example illustrates the use of pillared clays for the separation of gases. A Hewlett-Packard model 5880 gas chromatgraph (GC) equipped with a Natural Gas Analyzer package and a Level 4 GC terminal was used for gas preparation tests. A stainless steel adsorbent column of 10 feet length and 0.085 inch inner diameter was filled with 10–12 cc of 40/60 mesh pillared and unpillared clays (described in Example I), which were heated for 3 hours at 300° C. in the GC column before gas mixtures were passed through. The carrier gas flow in the gas chromatograph was 40 cc/minute; the pressure was about 760 torr; the oven temperature was 40° C.; and the sample size of the introduced gas mixtures was 0.25 cc.

The effectiveness of clay adsorbents for separating gases was quantitatively expressed by the resolution R, which was determined from the recorded gas chromatograms. R was calculated from the retention times ($t_2$, $t_1$) of two gases in the column and from the peak widths ($w_2$, $w_1$; given in time units) at half the height of each gas peak. R is defined as $(t_2-t_1)(w_2-w_1)$. The greater the value of R, the greater is the separation effectiveness of the clay adsorbent.

The following gas mixtures were tested: air (21 mole-% $O_2$, 78 mole-% $N_2$); a mixture of 5 mole-% $H_2$ and 95 mole-% $N_2$, a mixture of 50 mole-% of methane and 50 mole-% ethane; and a natural gas (comprising methane, ethane, propane, butanes, pentanes, carbon dioxide, air). Test results are summarized in Table III.

TABLE III

| Adsorbent | Resolution $O_2/N_2$ | Resolution $H_2/N_2$ | Resolution[1] $C_1/C_2$ | Resolution[2] $C_1/C_2$ | Resolution[2] $C_2/C_3$ |
|---|---|---|---|---|---|
| Unpillared Clay (Footnote (A), Table I) | 0.00 | 0.00 | 4.07 | 2.23 | 3.28 |
| Unaged Pillared Clay (Run 1, Table I) | 0.00 | 0.00 | — | — | — |
| Unaged Pillared Clay (Run 2, Table I) | 0.00 | 0.00 | 2.74 | 1.58 | 2.49 |
| Aged Pillared Clay (Run 4, Table I) | 0.00 | 0.00 | 8.93 | 9.21 | 7.22 |
| Unaged Pillared Clay (Footnote (B), Table I) | 0.00 | 0.00 | 5.65 | 5.03 | 4.55 |

[1]Used 50/50 methane/ethane mixture.
[2]Used natural gas.

As shown by data in Table III, pillared clays that were prepared with Chlorhydrol® solutions which had been aged six days (run 4) consistently gave highest resolutions and were thus most effective in separating the various gases, with the exception of $O_2/N_2$ and $H_2/N_2$. These pillared clays were also superior to pillared clays that were prepared with an unaged pillaring solution that had been heated to about 90° C. (before mixing with clay). Neither pillared nor unpillared clays were capable of separating $O_2$ from $N_2$ under the above GC test conditions.

EXAMPLE IV

This example illustrates the treatment of pillared clays so as to make them effective for the separation of oxygen from nitrogen. Pillared clays, prepared in accordance with the procedure of Example I, were impregnated with an aqueous, 0.1 molar solution of calcium acetate solution at room temperature for about 0.5 to 2.0 hours, recovered by filtration, dried and calcined substantially in accordance with the procedure described in Example I. The thus calcium-exchanged pillared clays were tested for $O_2/N_2$ separation in accordance with the procedure described in Example III. Results are summarized in Table IV.

TABLE IV

| Adsorbent | Calcium-Exchanged | Resolution $O_2/N_2$ | Resolution $H_2/N_2$ |
|---|---|---|---|
| Unaged Pillared Clay (Run 1, Table I) | Yes | 0.69 | 1.32 |
| Unaged Pillared Clay (Run 2, Table I) | Yes | 0.42 | 0.15 |
| Aged Pillared Clay (Run 4, Table I) | Yes | 1.14 | 2.49 |
| Unaged Pillared Clay (Footnote (B), | Yes | 0.95 | 2.11 |

TABLE IV-continued

| Adsorbent | Calcium-Exchanged | Resolution $O_2/N_2$ | Resolution $H_2/N_2$ |
|---|---|---|---|
| Table I) | | | 5 |

Data in Table IV show that surprisingly all calcium treated pillared clays were effective in separating oxygen and hydrogen from nitrogen. Furthermore, the Ca-exchanged pillared clay that had been prepared with an aged pillaring solution was most effective in separating $O_2/N_2$ and $H_2/N_2$.

EXAMPLE V

In this example the preparation and uses of mixtures containing pillared clays and zeolite are described. A combination of 20 weight-% pillared clay and 80 weight-% zeolite was prepared as follows.

225 mL of Solution A was heated to 60° C. with stirring. Then 7.0 grams of Bentonite clay were added to the solution; and the slurry was stirred at 60° C. for 2 hours. The formed pillared clay was recovered by filtration and washed with 20 ml of distilled water on the filter. The wet pillared clay, 50 mL of undiluted Chlorhydrol® and 28 grams of either 5A zeolite or 13X zeolite powder (both provided by Union Carbide) were added to a jar and manually shaken for about 5 minutes. Then the slurry was filtered; the filter cake was dried at about 110° C. overnight, and sieved. A 40/60 mesh portion of the pillared clay/zeolite mixture was calcined at about 500° C. for about 2 hours. A mixture of 50 weight-% pillared clay and 50 weight-% zeolite was prepared in the same manner (except for the weight of the clay).

The separation of methane from ethane (using a 50/50 mole-% gas mixture) by means of pillared clay/zeolite mixtures was compared with the separation of these gases by means of zeolites alone and unpillared clay/zeolite mixtures. All GC measurements were carried out essentially in accordance with the procedure described in Example III. Test results are summarized in Table V.

TABLE V

| Adsorbent | Resolution $C_1/C_2$ |
|---|---|
| Linde 5A Zeolite | 16.5 |
| 50 wt-% Pillared Bentonite Clay + 50 wt-% 5A Zeolite | 13.8; 14.4 |
| Linde 13X Zeolite | 13.3 |
| 80 wt-% Pillared Bentonite Clay + 20 wt-% 13X Zeolite | 12.7 |
| 50 wt-% Unpillared Bentonite Clay + 50 wt-% 13X Zeolite | 7.4 |

Data in Table V show that pillared clay/zeolite mixtures were almost as effective in separating methane and ethane as zeolites alone are considerably more effective than mixtures of an unpillared clay and zeolite.

EXAMPLE VI

The example illustrates the preparation of promoted pillared clays useful as hydrocarbon conversion catalysts.

Three pillared clay samples were prepared substantially in accordance with the procedure described in Example I. Two samples were prepared with pillaring solutions that had been aged 6 days before the addition of clay; the other sample was prepared with a pillaring solution that had been aged for 3 days. The concentration of $Al_2(OH)_5Cl.2H_2O$ in the pillaring solutions ranged from 0.6 to 1.1 weight-%.

The thus prepared pillared clay samples were heated in air (calcined) at about 400° C. for about two hours, allowed to cool and then impregnated as follows. An impregnating solution was prepared by mixing 20 g of $MoO_3$ (provided by Mallinckrodt, Inc., St. Louis, Mo.), 8 grams of nickel(II) carbonate and 200 mL of concentrated aqueous ammonia. 47 grams of each pillared clay sample was impregnated with 28 grams of the above described Ni/Mo solution. The thus impregnated pillared clays were partially dried at room temperature, then dried for 4 hours at 100° C. and finally heated in air for 4 hours at 400° C. The calcined materials were impregnated again with 20 cc of the above described Ni/Mo solution, partially dried at room temperature, dried for 2 hours at 120° C. and heated in air for 3 hours at 400° C.

The unpillared clay sample was impregnated substantially in accordance with the above-described procedure (except that only 100 mL of aqueous ammonia was used). Pertinent preparation parameters and properties of the impregnated catalyst materials are summarized in Table VI.

TABLE VI

| Catalyst | Support | Wt-% of Al Hydroxy Chloride in Pillar. Solution | Time of Aging of Pillar. Solution (Days) | Properties of Impregnated Clay | | |
|---|---|---|---|---|---|---|
| | | | | Surface Area $(m^2/g)$ | Wt-% Ni | Wt-% Mo |
| A (Control) | Unpillared Clay | — | — | 36 | 1.7 | 6.4 |
| B (Invention) | Pillared Clay | 1.1 | 3 | 192 | 1.6 | 5.7 |
| C (Invention) | Pillared Clay | 1.1 | 6 | 211 | 1.7 | 5.8 |
| D (Invention) | Pillard Clay | 0.6 | 6 | 253 | 1.9 | 6.0 |

EXAMPLE VII

This example illustrates the use of Ni/Mo-impregnated pillared clays as catalysts for hydrocracking of a petroleum fraction. The Ni/Mo-impregnated clay catalysts A-D were sulfided by heating in a mixture of $H_2$ (about 0.46 SCF/min), and $H_2S$ (0.05 SCF/min) at 400° F. for 28 hours, and then at 700° F. for 28 hours. 25 cc of each cooled, sulfided clay was mixed with 50 cc Alundum alumina (surface area: less than 1 $m^2/g$; marketed by Norton Chemical Process Products, Akron, Ohio) and employed in hydrocracking tests.

A vacuum gas oil having an $API^{60}$ gravity of about 29.0 was pumped downward through an induction tube into a trickle bed reactor of 28.5 inches length and 0.75 inch inner diameter. The induction tube extended into a 6–7 inch high Alundum top layer above described mixture of sulfided, impregnated clay catalysts and Alundum. Hydrogen gas was introduced into the reactor through a tube that concentrically surrounded the induction tube but extended only as far as the reactor top. The reactor was heated with a Thermcraft (Winston-Salem, NC) Model 211 3-zone furnace. The reactor temperature was measured in the catalyst bed at three different locations by three separate thermocouples embedded in an axial thermocouple well (outer diameter: 0.25 inch). The liquid product was collected for API measurements; non-consumed hydrogen gas was vented. Pertinent reaction conditions were: 700°–800° F.; 1500 psig; LHSV of 1.0; H$_2$ flow of 1.5 SCF per hour; run time: about 80 hours. Hydrocracking results are summarized in Table VII.

TABLE VII

| Catalyst | API$^{60}$ of Product at Cracking Temperature (°F.) of | | | | |
|---|---|---|---|---|---|
| | 700 | 750 | 775 | 800 | 825 |
| A (Control) | 26.1 | 26.7 | 27.4 | 28.8 | 30.8 |
| B (Invention) | 28.0 | 29.4 | 34.6 | 36.0 | 34.8 |
| C (Invention) | 27.5 | 30.1 | 37.0 | 36.9 | 35.1 |
| D (Invention) | 27.7 | 35.7 | 36.8 | 37.1 | 34.7 |

Data in Table VII show that impregnated pillared clays (Catalysts B, C, D) were more effective than impregnated unpillared clay (Catalyst A) in increasing the API gravity of the oil feed thus indicating a higher degree of cracking. Generally Catalysts C and D were slightly more effective than Catalyst B indicating that longer aging of the pillaring solution (6 days vs. 3 days) before treatment of the clay had a beneficial effect on the performance of the impregnated, calcined and sulfided pillared clays in catalytic hydrocracking operations.

The highest API gravity increases occurred at a hydrocracking temperature of about 775°–800° F. when impregnated pillared clays were employed as catalysts. At a hydrocracking temperature of 825° F., a slightly lower API gravity of the product was attained indicating that at a temperature exceeding 800° F. some thermal degration of the pillared clays might have occurred (e.g., partial collapsing of the pillars).

Based on the above reported results, it is believed that promoted pillared clay catalysts are also effective in the fluidized catalytic cracking of oils (without hydrogen), and in hydrofining of oils (desulfurization, denitrogenation and demetallization).

We claim:

1. A method for preparing a pillared, interlayered clay product comprising:
    (a) diluting an aluminum hydroxy chloride compound with water to obtain an aqueous solution containing from about 0.4 to about 10 weight percent of aluminum hydroxy chloride;
    (b) maintaining said aqueous solution at a temperature in the range from about 20° C. to about 70° C. for a time sufficient to increase the surface area and pore volume of a pillared, interlayered clay product subsequently obtained by reacting smectite clay with said aqueous solution;
    (c) reacting smectite clay with said aqueous solution thereby obtaining an aluminum-exchanged clay product in an aqueous liquid;
    (d) separating said aluminum-exchanged clay product from said aqueous liquid;
    (e) dispersing said aluminum-exchanged clay product in water;
    (f) separating aluminum-exchanged clay product from said distilled water;
    (g) drying said aluminum-exchanged clay product to obtain a substantially dried aluminum-exchanged clay product; and
    (h) calcining said substantially dried aluminum-exchanged clay product to obtain a calcined aluminum-exchanged clay product which is a pillared, interlayered clay product.

2. A method of claim 1 wherein reacting smectite clay with said aqueous solution comprises agitating said clay and said aqueous solution at a temperature in a range of about 20° C. to about 70° C. for a time sufficient to obtain an aluminum-exchanged smectite product.

3. A method of claim 1 wherein obtaining aluminum-exchanged clay product separated from said aqueous liquid comprises obtaining a filter cake of aluminum-exchanged clay product.

4. A method of claim 2 wherein obtaining aluminum-exchanged clay product separated from said aqueous liquid comprises obtaining a filter cake of aluminum-exchanged clay product.

5. A method for preparing a calcium-exchanged, pillared, interlayered clay product comprising:
    (a) diluting an aluminum hydroxy chloride compound with water to obtain an aqueous solution containing from about 0.4 to about 10 weight percent of aluminum hydroxy chloride;
    (b) maintaining said aqueous solution at a temperature in the range from about 20° C. to about 70° C. for a time sufficient to increase the surface area and pore volume of a pillared, interlayered clay product subsequently obtained by reacting smectite clay with said aqueous solution;
    (c) reacting smectite clay with said aqueous solution thereby obtaining an aluminum-exchanged clay product in an aqueous liquid;
    (d) separating said aluminum-exchanged clay product from said aqueous liquid;
    (e) contacting said aluminum-exchanged clay product with a solution of calcium acetate for a time sufficient to produce a calcium-exchanged clay product;
    (f) separating calcium-exchanged clay product from said distilled water;
    (g) drying said calcium-exchanged clay product to obtain a substantially dried calcium-exchanged clay product; and
    (h) calcining said substantially dried calcium-exchanged clay product to obtain a calcined calcium-exchanged clay product which is a pillared, interlayered clay product.

6. A method of claim 5 wherein reacting smectite clay with said aqueous solution comprises agitating said clay and said aqueous solution at a temperature in a range of about 20° C. to about 70° C. for a time sufficient to obtain an aluminum-exchanged smectite product.

7. A method of claim 5 wherein obtaining aluminum-exchanged clay product separated from said aqueous liquid comprises obtaining a filter cake of aluminum-exchanged clay product.

8. A method of claim 5 wherein obtaining aluminum-exchanged clay product separated from said aqueous liquid comprises obtaining a filter cake of aluminum-exchanged clay product.

9. A method for preparing a pillared, interlayered clay admixed with zeolite comprising:
   (a) diluting an aluminum hydroxy chloride compound with water to obtain an aqueous solution containing from about 0.4 to about 10 weight percent of aluminum hydroxy chloride;
   (b) maintaining said aqueous solution at a temperature in the range from about 20° C. to about 70° C. for a time sufficient to increase the surface area and pore volume of a pillared, interlayered clay product subsequently obtained by reacting smectite clay with said aqueous solution;
   (c) reacting smectite clay with said aqueous solution thereby obtaining an aluminum-exchanged clay product in an aqueous liquid;
   (d) separating said aluminum-exchanged clay product from said aqueous liquid;
   (e) contacting said aluminum-exchanged clay product with sufficient distilled water to provide a washed aluminum-exchanged clay product;
   (f) recovering washed aluminum-exchanged clay product;
   (g) agitating washed aluminum-exchanged clay product with aqueous solution containing aluminum hydroxy chloride and zeolite to produce a slurry of a mixture of aluminum-exchanged clay product and aluminum hydroxy chloride treated zeolite in aqueous liquid;
   (h) separating said mixture of aluminum-exchanged clay product and aluminum hydroxy chloride treated zeolite from said aqueous liquid;
   (i) drying said mixture to obtain a substantially dry mixture of aluminum-exchanged clay product and aluminum hydroxy chloride treated zeolite; and
   (j) calcining said mixture of aluminum-exchanged clay product and aluminum hydroxy chloride treated zeolite to obtain a calcined mixture of said aluminum-exchanged clay product and aluminum hydroxy chloride treated zeolite which is a pillared, interlayered clay product.

10. A method of claim 9 wherein reacting smectite clay with said aqueous solution comprises agitating said clay and said aqueous solution at a temperature in a range of about 20° C. to about 70° C. for a time sufficient to obtain an aluminum-exchanged smectite product.

11. A method of claim 9 wherein obtaining aluminum-exchanged clay product separated from said aqueous liquid comprises obtaining a filter cake of aluminum-exchanged clay product.

12. A method of claim 9 wherein obtaining aluminum-exchanged clay product separated from said aqueous liquid comprises obtaining a filter cake of aluminum-exchanged clay product.

13. A method for preparing a promoted pillared clay catalyst comprising:
   (a) contacting a pillared, interlayered clay product prepared by the method of claim 1 with an impregnating solution of catalytically active compound or mixture of compounds for a time sufficient to impregnate said pillared, interlayered clay product with a catalytic amount of said catalytically active compound or mixture of compounds and
   (b) recovering impregnated pillared, interlayered clay product from said impregnating solution.

14. A method of claim 13 further comprising:
   (c) drying said impregnated pillared, interlayered clay product at an elevated temperature for a time sufficient to produce a substantially dried impregnated pillared, interlayered clay product; and
   (d) calcining said dried impregnated pillared, interlayered clay product provide a calcined impregnated pillared, interlayered clay product.

15. A method of claim 14 wherein steps (a), (b), (c) and (d) are repeated at least once to increase the degree of impregnation of catalyst.

16. A method of claim 15 wherein said mixture of impregnating compounds comprises $MoO_3$ and nickel (II) carbonate.

17. A method of claim 5 for preparing a promoted pillared clay catalyst comprising:
   (a) contacting a pillared, interlayered clay product prepared by the method of claim 1 with an impregnating solution of catalytically active compound or mixture of compounds for a time sufficient to impregnate said pillared, interlayered clay product with a catalytic amount of said catalytically active compound or mixture of compounds and
   (b) recovering impregnated pillared, interlayered clay product from said impregnating solution.

18. A method for claim 17 further comprising:
   (c) drying said impregnated pillared, interlayered clay product at an elevated temperature for a time sufficient to produce a substantially dried impregnated pillared, interlayered clay product; and
   (d) calcining said dried impregnated pillared, interlayered clay product provide a calcined impregnated pillared, interlayered clay product.

19. A method of claim 17 wherein steps (a), (b), (c), and (d) are repeated at least once to increase the degree of impregnation of catalyst.

20. A method of claim 9 for preparing a promoted pillared clay catalyst comprising:
   (a) contacting a pillared, interlayered clay product prepared by the method of claim 1 with an impregnating solution of catalytically active compound or mixture of compounds for a time sufficient to impregnate said pillared, interlayered clay product with a catalytic amount of said catalytically active compound or mixture of compounds and,
   (b) recovering impregnated pillared, interlayered clay product from said impregnating solution.

21. A method of claim 20 further comprising:
   (c) drying said impregnated pillared, interlayered clay product at an elevated temperature for a time sufficient to produce a substantially dried impregnated pillared, interlayered clay product; and
   (d) calcining said dried impregnating pillared, interlayered clay product provide a calcined impregnated pillared, interlayered clay product.

22. A method of claim 20 wherein steps (a), (b), (c), and (d) are repeated at least once to increase the degree of impregnation of catalyst.

23. A pillared, interlayered clay product prepared by the method of claim 1.

24. A pillared, interlayered clay product prepared by the method of claim 2.

25. A pillared, interlayered clay product prepared by the method of claim 3.

26. A pillared, interlayered clay product prepared by the method of claim 4.

27. A pillared, interlayered clay product prepared by the method of claim 5.

28. A pillared, interlayered clay product prepared by the method of claim 6.

29. A pillared, interlayered clay product prepared by the method of claim 7.

30. A pillared, interlayered clay product prepared by the method of claim 8.

31. A pillared, interlayered clay admixed with zeolite prepared by the method of claim 9.

32. A pillared, interlayered clay admixed with zeolite prepared by the method of claim 10.

33. A pillared, interlayered clay admixed with zeolite prepared by the method of claim 11.

34. A pillared, interlayered clay admixed with zeolite prepared by the method of claim 12.

35. A promoted pillared clay catalyst prepared by the method of claim 13.

36. A promoted pillared clay catalyst prepared by the method of claim 14.

37. A promoted pillared clay catalyst prepared by the method of claim 15.

38. A promoted pillared clay catalyst prepared by the method of claim 16.

39. A promoted pillared clay catalyst prepared by the method of claim 17.

40. A promoted pillared clay catalyst prepared by the method of claim 18.

41. A promoted pillared clay catalyst prepared by the method of claim 19.

42. A promoted pillared clay catalyst prepared by the method of claim 20.

43. A promoted pillared clay catalyst prepared by the method of claim 21.

44. A promoted pillared clay catalyst prepared by the method of claim 22.

45. A promoted pillared clay catalyst prepared by the method of claim 23.

* * * * *